United States Patent
You et al.

(10) Patent No.: US 7,279,101 B2
(45) Date of Patent: Oct. 9, 2007

(54) ANAEROBIC BIOLOGICAL WASTEWATER TREATMENT SYSTEM AND PROCESS

(75) Inventors: Huey-Song You, Hsinchu (TW); Shan-Shan Chou, Hsinchu (TW); Shui-Chen Lien, Hsinchu (TW); Wung-Jung Wu, Hsinchu (TW); Hsin-Jung Lin, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 393 days.

(21) Appl. No.: 11/097,176

(22) Filed: Apr. 4, 2005

(65) Prior Publication Data
US 2006/0131231 A1    Jun. 22, 2006

(30) Foreign Application Priority Data
Dec. 20, 2004    (TW) .............................. 93139650 A

(51) Int. Cl.
*C02F 3/30* (2006.01)

(52) U.S. Cl. ...................... 210/605; 210/631; 210/150; 210/221.1; 210/221.2

(58) Field of Classification Search ................ 210/605, 210/631, 150, 221.1, 221.2
See application file for complete search history.

(56) References Cited

U.S. PATENT DOCUMENTS
6,592,751 B2 *    7/2003   Haridas ........................ 210/97

FOREIGN PATENT DOCUMENTS
JP                5-277493 A       10/1993

* cited by examiner

*Primary Examiner*—Chester T. Barry
(74) *Attorney, Agent, or Firm*—Bacon & Thomas PLLC

(57) ABSTRACT

The present invention discloses an anaerobic biological wastewater treatment system for treating wastewater containing organic contaminants, which includes an anaerobic sludge bed reactor and a dissolved-air flotation tank. The anaerobic sludge bed reactor is used to decompose organic contaminants by way of an anaerobic biological treatment. The dissolved-air flotation tank is used to carry out liquid-solid separation on effluent from the anaerobic sludge bed reactor, so that anaerobic microorganisms entrained in the effluent can be recovered and recycled to the anaerobic sludge bed reactor, thereby enhancing the hydraulic loading of the anaerobic sludge bed reactor.

9 Claims, 2 Drawing Sheets

ANAEROBIC BIOLOGICAL WASTEWATER TREATMENT SYSTEM AND PROCESS

FIELD OF THE INVENTION

The present invention relates to an anaerobic biological wastewater treatment technique for treating wastewater containing organic contaminants, and in particular discloses an anaerobic biological wastewater treatment system and process that combines an anaerobic biological wastewater treatment technique with a dissolved-air flotation technique for treating wastewater that contains organic contaminants.

BACKGROUND OF THE INVENTION

Anaerobic biological wastewater treatment is one of the more common techniques in the treatment of wastewater that contains organic contaminants. An anaerobic sludge bed is the most commonly used reactor in anaerobic biological wastewater treatment. However, since anaerobic microorganisms have low yield, a key technical issue for an anaerobic sludge bed reactor is how to retain large quantities of anaerobic microorganisms in the reactor in order to optimize the performance of the anaerobic sludge bed reactor. At present, commercially available anaerobic sludge bed reactors include Biothane® UASB and BIOPAQ® UASB reactors. UASB is an abbreviation of "Upflow anaerobic sludge bed." The applicant of the present invention has disclosed a UASB reactor in Taiwan Utility Patent No. 156653. One of the key techniques of a UASB reactor includes the design of a solid-gas-liquid three-phase separator.

The conventional design of a three-phase separator is limited by the size of the anaerobic sludge bed reactor, and by the properties of the microorganisms (e.g. the size and density of the microorganisms, etc.), which impose extremely high limitations on the hydraulic load of such a separator. For a conventional separator, the typical hydraulic load per unit area (front projection area) is generally 15-30 $m^3/m^2$-day. Therefore, when the concentration of the organic pollutants in the wastewater is low, the efficiency of the anaerobic sludge bed reactor per unit volume is restricted by the hydraulic conditions, and the reactor cannot perform desired functions.

A dissolved-air flotation (DAF) wastewater treatment technique is commonly used for wastewater treatment in a food processing plant, wherein air dissolved under high pressure is mixed with wastewater in a DAF tank to form numerous tiny bubbles that adhere onto solid particles in the wastewater (such as fat and protein particles that are generated during the washing of meat). Consequently, the air-buoyed solid particles that float on top of the wastewater in the DAF tank can be skimmed off, and the processed water can be discharged from the bottom or middle section of the DAF tank. A DAF tank is commercially available, and has been disclosed in various patents, such as U.S. Pat. Nos. 5,382,358, 5,538,631, 5,863,441, 6,174,434 and 6,599,418. U.S. Pat. No. 6,599,418 discloses a wastewater treatment device combining DAF with a gravitational sedimentation mechanism, wherein wastewater is first introduced into a gravitational sedimentation chamber located at a lower section of the device. Heavier solid particles precipitate first; the water containing lighter solid particles next goes through a serially connected flow channel and enters a DAF chamber located at a top section of the device to undergo an ordinary DAF treatment. An air dissolving device is mounted in the serially connected flow channel. The contents of U.S. Pat. No. 6,599,418 is incorporated herein by reference.

Those skilled in the art generally declare that anaerobic microorganisms should avoid contact with air in order to prevent reduction of the decomposing ability thereof of organic pollutants. Thus, to date no disclosure or suggestions are present in the prior art for solving the problems associated with the hydraulic load restrictions in an anaerobic microorganism treatment technique using a DAF wastewater treatment technique.

SUMMARY OF THE INVENTION

The present invention discloses an anaerobic biological wastewater treatment system and method that combines an anaerobic microorganism treatment technique with a DAF wastewater treatment technique. The present invention results from the discovery that a short exposure of anaerobic microorganisms in a DAF tank with air will not conspicuously reduce the ability of the microorganisms to decompose organic pollutants.

According to the present invention, a DAF wastewater treatment technique is used to replace a solid-gas-liquid three-phase separator of a conventional UASB reactor, thereby not only resolving the problem of a low hydraulic load in a UASB reactor, but also reducing the initial installation costs of an anaerobic biological wastewater treatment system.

A wastewater treatment system according to the present invention for treating wastewater containing organic contaminants includes an anaerobic sludge bed reactor comprising a reactor body, and a first inlet and a first outlet installed on the reactor body, wherein the tank body is suitable for accommodating an anaerobic sludge bed and receiving wastewater containing organic contaminants entering from the first inlet. After being retained in the reactor body for a certain period of time, the wastewater is discharged from the first outlet, wherein at least a portion of the organic contaminants in the wastewater is decomposed by the anaerobic microorganisms in the anaerobic sludge bed during the period of time. The wastewater treatment system also comprises a dissolved-air flotation (DAF) tank comprising a tank body, a second inlet and a second outlet installed on the tank body, a mixing device, and an air flotation sludge removal device. The second inlet is connected to the first outlet, wherein the mixing device is used to mix a high pressure air with the water discharged from the first outlet, and to release the mixed high pressure fluid into the DAF tank. The air flotation sludge removal device is used to remove air flotation sludge in the DAF tank. The second outlet is used to discharge processed water from the DAF tank.

Preferably, the DAF tank further comprises a chemical agent addition device.

Preferably, the wastewater treatment system of the present invention further comprises a transport device for feeding the air flotation sludge back to the anaerobic sludge bed reactor or to a waste sludge storage tank.

Preferably, the second outlet is located at a bottom or middle portion of the tank body of the DAF tank.

In the wastewater treatment system of the present invention air dissolved in the high pressure stream forms numerous fine bubbles that adhere onto sludge particles in the wastewater due to a reduction in the pressure in the tank body of the DAF tank, so as to form flotation sludge on the surface of the wastewater in the DAF tank.

Wastewater is purified by removing at least a portion of the organic contaminants in the wastewater by an anaerobic biological treatment process in the anaerobic sludge bed reactor. When treated wastewater is discharged from the anaerobic sludge bed reactor, some anaerobic microorganisms are entrained out of the reactor. The DAF reactor is installed downstream of the anaerobic sludge bed reactor, and uses high pressure air to dissolve air and to mix the wastewater. The high pressure air is released in the DAF tank, and dissolved air (or any other suitable gas) forms numerous tiny bubbles due to the release of pressure, which adhere onto solid particles (e.g. sludge particles of microorganisms) in the wastewater. Thus, air flotation sludge on the surface of the wastewater can be skimmed off from the top of the DAF tank, and the treated water can be discharged from the bottom or intermediate section of the DAF tank. The air flotation sludge (anaerobic microorganisms) removed from the DAF tank can be recycled to the anaerobic sludge bed reactor in order to increase the concentration of microorganisms in the anaerobic sludge bed reactor.

The conventional anaerobic sludge bed treatment technique has the advantage of having a high volumetric efficiency on concentrated wastewater. However, when the concentration of organic matter in the wastewater is reduced, the anaerobic sludge bed treatment technique does not exhibit the desired efficiency due to limitations imposed by the hydraulic conditions. The present invention combines an anaerobic microorganism treatment technique with a dissolved-air flotation technique to overcome the hydraulic limitation problems associated with a conventional anaerobic sludge bed treatment technique, and for the convenience of further promoting an anaerobic sludge bed treatment technique in such areas as municipal sewage, organic industrial wastewater with a low concentrations, etc.

LEGENDS

Figure 1:
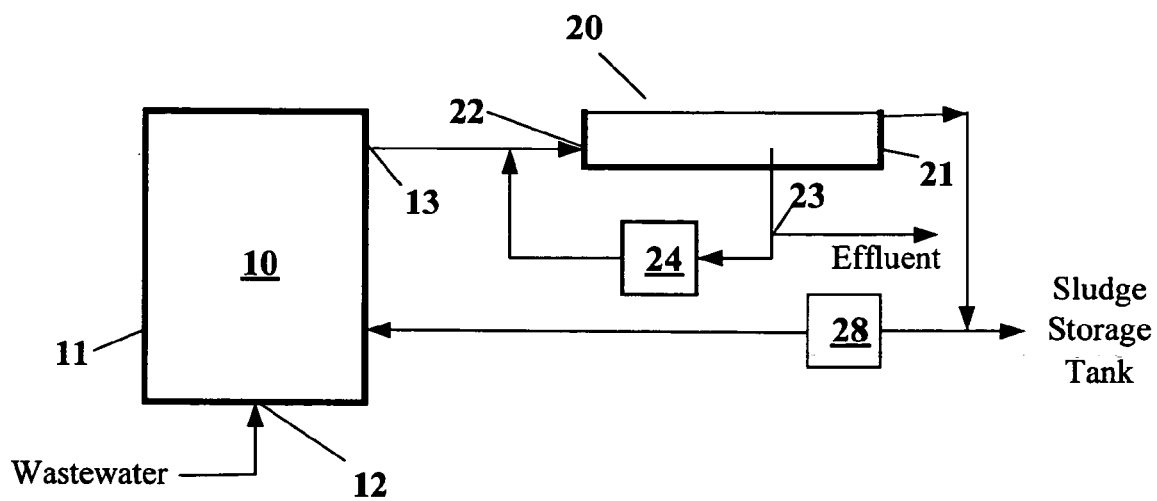
FIG. 1 is a schematic diagram of a wastewater treatment process for treating wastewater containing organic contaminants in a preferred embodiment according to the present invention.

10 . . . anaerobic sludge bed reaction tank
11,21 . . . tank body
12,22 . . . inlet
13,23 . . . outlet
20 . . . dissolved-air flotation tank (DAF tank)
24 . . . mixing device
25 . . . air flotation sludge removal device
26 . . . distributor
27 . . . concentrated sludge
28 . . . transport device
241 . . . pressurization pump
242 . . . pressure tank
243 . . . air compressor

DETAILED DESCRIPTION OF THE INVENTION

The present invention discloses an anaerobic biological wastewater treatment process for treating wastewater, comprising:

a) contacting wastewater containing organic contaminants with an anaerobic sludge bed containing anaerobic microorganisms in order to decompose at least a portion of the organic contaminants in the wastewater by the anaerobic microorganisms and obtain a partially purified water;

b) mixing the partially purified water from step (a) with a high pressure dissolved air, and releasing the resulting mixture in a container in order to form a gas-liquid-solid mixture having numerous fine bubbles in the container, wherein the fine bubbles adhere onto sludge particles in the gas-liquid-solid mixture so as to form a flotation sludge on the liquid surface in the container; and c) removing the flotation sludge from the container and discharging processed water from a location below the flotation sludge.

Preferably, the method of the present invention further comprises recycling a portion or all of the flotation sludge removed from step (c) as a portion of a source of said anaerobic sludge bed in step (a).

Preferably, the method of the present invention further comprises delivering a portion or all of the flotation sludge removed from step (c) to a waste sludge storage tank.

Preferably, the method of the present invention further comprises adding a coagulation agent into the mixture of the partially purified water and the high pressure dissolved air in step (b).

Figure 2:
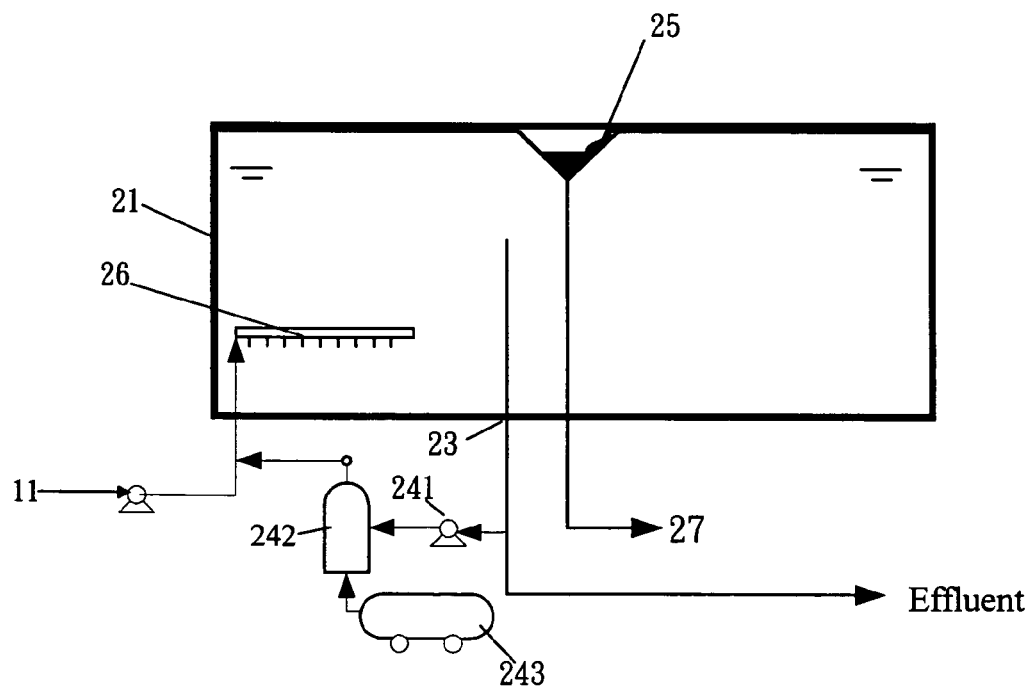
FIG. 2 is a schematic diagram of a DAF tank shown in FIG. 1.

A preferred embodiment according to the present invention is described in conjunction with the following drawings. As shown in FIGS. 1 and 2, a treatment system for organically polluted wastewater according to the present invention includes: an anaerobic sludge bed tank 10 having a tank body 11, a first inlet 12 and a first outlet 13 installed on the base of the tank body. The tank body contains an anaerobic sludge bed, and wastewater containing organic contaminants enters through the first inlet. After being retained within the tank body for a period of time, the wastewater is discharged from the first outlet 13. At least a portion of the organic contaminants in the wastewater is thereby decomposed by the anaerobic microorganisms in the anaerobic sludge bed during the period of time.

The preferred embodiment also comprises a dissolved-air flotation (DAF) tank 20 comprising a tank body 21, a second inlet 22 and a second outlet 23 installed on the tank body, a mixing device 24, and an air flotation sludge removal device 25. The second inlet 22 is connected to the first outlet 13.

The mixing device 24 includes a pressurization pump 241, a pressure tank 242, and a compressor 243. The pressurization pump 241 delivers a portion of the effluent from the tank body 21 to the pressure tank 242 to be mixed with high pressure air from the compressor 243, thereby producing water with a high air content. The water from the pressure tank 242 merges with the effluent from the first outlet 13 of the anaerobic sludge tank 10. The merged stream flows through a distributor 26 into the tank body 21 of the DAF tank. Due to a lower hydraulic pressure in the tank body 21, the high pressure air dissolved in water forms numerous tiny bubbles when the combined stream flows out of the distributor 26. The tiny bubbles adhere onto sludge particles in water, thereby forming air flotation sludge on the surface of the liquid in the tank body 21. The air flotation sludge removal device 25 collects the air flotation sludge in the DAF tank body 21 and removes the sludge from the DAF tank body 21, thereby obtaining a concentrated sludge 27. A portion of the effluent from the tank body 21 is taken as treated water and discharged from the second outlet 23.

A transport device 28 is used to recycle the concentrated sludge 27 to the anaerobic sludge bed tank 10 and/or a waste sludge storage tank.

The advantages of the present invention may be further understood by way of the following examples, which are for illustrative purposes only and should not be construed as limiting the scope of the present invention as claimed.

EXAMPLE 1

Figure 3:
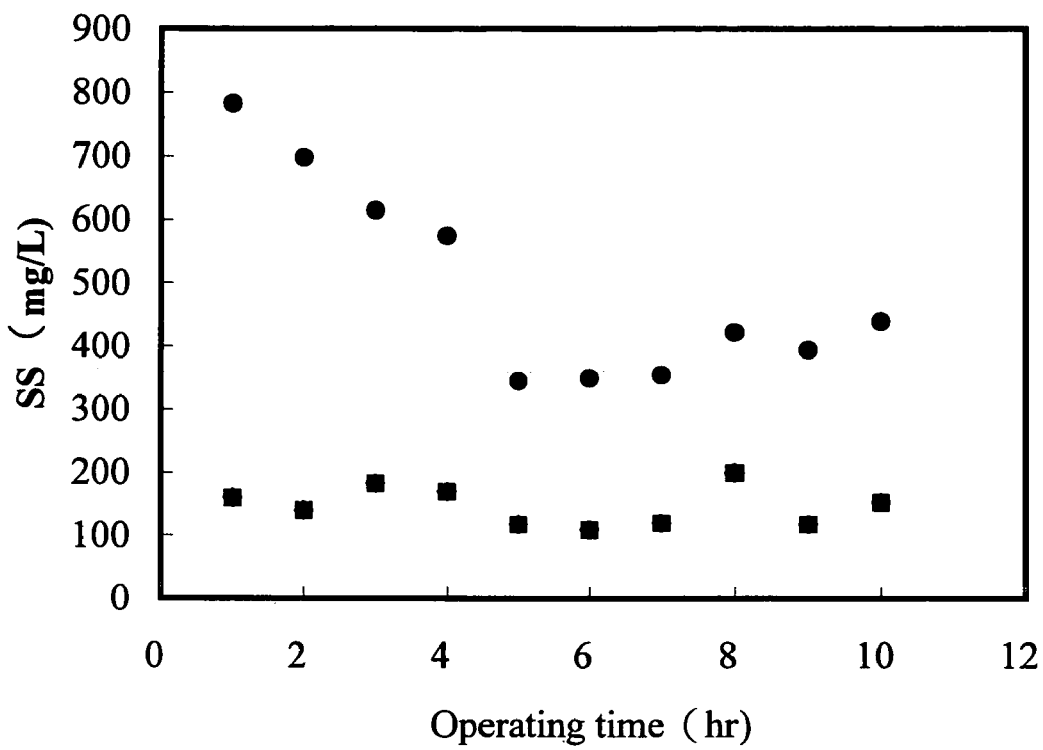
FIG. 3 presents results of an anaerobic wastewater treatment process according to the present invention, wherein the abscissa represents the operating time (hour) and the ordinate represents the concentration of suspension solids (SS) in an influent (round dot) and effluent (square dot) from a DAF tank.

As shown in FIG. 1, the system of this example included an anaerobic sludge bed tank and a DAF tank. The system was tested in a food processing plant. The anaerobic sludge bed treatment tank used the UASB reaction tank of the food processing plant. The UASB was equipped with a three-phase separator with a hydraulic load of 16 $m^3/m^2$-day. The UASB reaction tank had a volume of 390 $m^3$, and a water treatment capacity of 1000 $m^3$/day. As shown in FIG. 2, the DAF tank included a tank body with a diameter of 1.2 meters. In this example, 120 L/min of water was pumped from the bottom the three-phase separator of the UASB reaction tank to perform a separation test of the DAF tank. The experimental process did not include a chemical reagent. The hydraulic load of the DAF tank was 150 $m^3/m^2$-day, the pressure of the pressure tank was 4.5 $kg/cm^2$, and the reflux flow was 50 L/min. The experimental results are shown in FIG. 3, wherein the concentration of the suspension solids (SS) of the influent of the DAF tank was 350-800 mg/L, and the value for the effluent was stably maintained at 100-200 mg/L.

In the following Example 2, the maximum methane production activity (Qmax) of the anaerobic microorganism was used to evaluate the anaerobic activity of the anaerobic microorganisms removed from the DAF tank.

EXAMPLE 2

This experiment was carried out in a batchwise procedure and included mounting an anaerobic sludge in a DAF tank and setting the pressure tank at different pressures (more oxygen being released at a higher pressures) to perform a flotation process for a specified period of time (10 minutes). The floatation concentrated sludge collected from the liquid surface of the DAF tank was measured by the same anaerobic microorganism activity measurement procedure in order to obtain a maximum methane production activity (Qmax) for the anaerobic microorganisms, and the obtained value was compared to the activity of the original sludge (unfloated).

Figure 4:
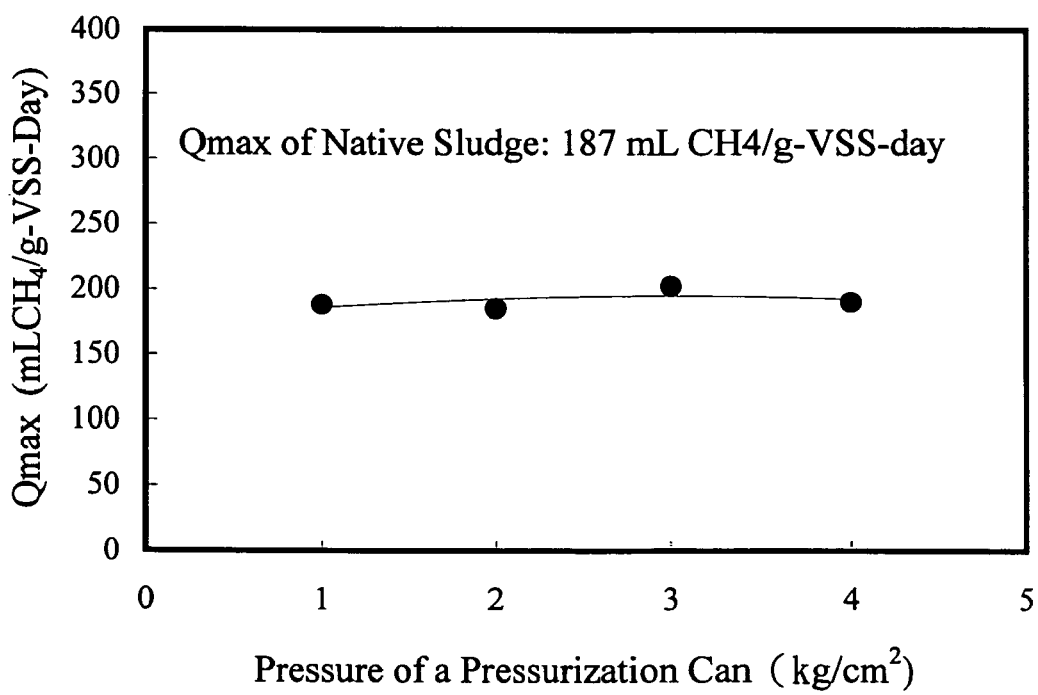
FIG. 4 presents maximum methane production activities (Qmax) for concentrated sludge collected when pressures of a pressure tank of a flotation tank are set at 1, 2, 3, 4 kg/cm$^2$, respectively, and for native sludge.

A procedure for measuring the maximum methane production activity (Qmax) is described below. Microorganisms were loaded in an Erlenmeyer flask, and a quantitative amount of sodium acetate was added into the flask as an organic material. Next, nitrogen was introduced into the flask to flush out air therein, and subsequently the flask was sealed with a rubber plug containing a gas tube. The gas tube was connected to an inverted scaled glass container containing NAOH. The equipped Erlenmeyer flask was mounted on an oscillatory device and fixed at 35° C. by a water bath. When sodium acetate was decomposed by anaerobic methane-producing bacteria, $CO_2$ and $CH_4$ gases were produced. The produced gas mixture was introduced to a glass container and collected therein by a water displacement method, during which $CO_2$ gas was absorbed by the alkaline solution. Thus, the gas collected by the inverted glass container was $CH_4$. The experiment was conducted for 24 hours, and the amount of $CH_4$ accumulated was indicated on the scale. Upon completion of the experiment, the quantity of microorganisms in each set of experiment was measured, thereby obtaining Qmax (mL $CH_4$/g-VSS-day) for each set of experiments. In this experiment, a native sludge without being subjected to flotation was used as a blank control. The results are shown in FIG. 4, wherein Qmax of the native sludge was 187 mL $CH_4$/g-VSS-day (VSS representing volatile suspension solids—i.e. microorganisms); Qmax values for the flotation concentrated sludge collected from the flotation tank, with the pressurization pressure being set at 1, 2, 3, and 4 $kg/cm^2$, respectively, were 185-202 mL $CH_4$/g-VSS-day. After taking into account experimental errors, Qmax values for the concentrated sludge collected from the flotation tank with the pressurization pressure being set at 1, 2, 3, and 4 $kg/cm^2$, respectively, were comparable to the Qmax values of the native sludge. This finding indicated that no reduction of anaerobic activity occurred.

The invention claimed is:

1. A wastewater treatment system for treating wastewater containing organic contaminants, comprising:
    an anaerobic sludge bed reactor, which includes a reactor body, and a first inlet and a first outlet installed on the reactor body, wherein the tank body is suitable for accommodating an anaerobic sludge bed and receiving wastewater containing organic contaminants entering from the first inlet, wherein after being retaining in the tank body for a period of time, the wastewater is discharged from the first outlet, wherein at least a portion of the organic contaminants in the wastewater is decomposed by anaerobic microorganisms in the anaerobic sludge bed during the period of time; and
    a dissolved-air flotation (DAF) tank comprising a tank body, a second inlet and a second outlet installed on the tank body, a mixing device, and an air flotation sludge removal device, wherein the second inlet is connected to the first outlet, and wherein the mixing device is used to mix a high pressure air with water discharged from the first outlet and release the mixed high pressure fluid into the DAF tank, wherein the air flotation sludge removal device is used to remove air flotation sludge in the DAF tank from the DAF tank, and wherein the second outlet is used to discharge processed water from the DAF tank.

2. The wastewater treatment system for treating wastewater containing organic contaminants as claimed in claim 1, further comprising a transport device for feeding the air flotation sludge back to the anaerobic sludge bed reactor or to a waste sludge storage tank.

3. The wastewater treatment system for treating wastewater containing organic contaminants as claimed in claim 1, wherein the second outlet is located at a bottom or middle portion of the tank body of the DAF tank.

4. The wastewater treatment system for treating wastewater containing organic contaminants as claimed in claim 1, wherein air dissolved in the high pressure stream forms numerous fine bubbles that adhere onto sludge particles in the wastewater due to a reduction in the pressure in the tank body of the DAF tank, so as to form flotation sludge on the surface of the wastewater in the DAF tank.

5. The wastewater treatment system for treating wastewater containing organic contaminants as claimed in claim 1, wherein the DAF tank further comprises a chemical agent addition device.

6. An anaerobic biological wastewater treatment process for treating wastewater, comprising:
a) contacting wastewater containing organic contaminants with an anaerobic sludge bed containing anaerobic microorganisms in order to decompose at least a portion of the organic contaminants in the wastewater by the anaerobic microorganisms and obtain a partially purified water;
b) mixing the partially purified water from step (a) with a high pressure dissolved air, and releasing the resulting mixture in a container in order to form a gas-liquid-solid mixture having numerous fine bubbles in the container, wherein the fine bubbles adhere onto sludge particles in the gas-liquid-solid mixture so as to form a flotation sludge on the liquid surface in the container; and
c) removing the flotation sludge from the container and discharging processed water from a location below the flotation sludge.

7. The method as claimed in claim 6, further comprising recycling a portion or all of the flotation sludge removed from step (c) as a portion of a source of said anaerobic sludge bed in step (a).

8. The method as claimed in claim 6, further comprising delivering a portion or all of the flotation sludge removed from step (c) to a waste sludge storage tank.

9. The method as claimed in claim 6, further comprising adding a coagulation agent into the mixture of the partially purified water and the high pressure dissolved air in step (b).

* * * * *